United States Patent [19]

Bianchi

[11] Patent Number: 4,496,452
[45] Date of Patent: Jan. 29, 1985

[54] APPARATUS AND PROCESS FOR PRODUCING CHLORINE GAS AND FOR EMPLOYING SUCH CHLORINE GAS FOR THE PRODUCTION OF CHLORINE WATER

[75] Inventor: Guiseppe Bianchi, Milan, Italy

[73] Assignee: Industrie Zanussi S.p.A., Pordenone, Italy

[21] Appl. No.: 559,023

[22] Filed: Dec. 7, 1983

[30] Foreign Application Priority Data

Dec. 23, 1982 [IT] Italy ................. 24932 A/82

[51] Int. Cl.³ .................. C25B 9/00; C02C 5/12
[52] U.S. Cl. .................... 204/266; 204/278; 204/151; 204/128; 422/187; 424/149; 423/473
[58] Field of Search .............. 204/81, 94, 103, 151, 204/266, 278, 133, 128, 98; 422/37, 187; 423/473; 424/149

[56] References Cited

U.S. PATENT DOCUMENTS

| 802,960 | 1/1905 | Briggs | 204/229 |
|---|---|---|---|
| 951,311 | 3/1910 | Hartman | 204/229 |
| 1,332,581 | 3/1920 | Tobler | 204/98 |
| 1,581,944 | 4/1926 | Hausmeister | 204/230 |
| 2,055,961 | 9/1936 | Boss | 204/98 |
| 3,917,521 | 11/1975 | Clarke et al. | 204/149 |
| 4,361,471 | 11/1982 | Kosarek | 204/128 |

Primary Examiner—Brian E. Hearn
Assistant Examiner—Nathan Thane
Attorney, Agent, or Firm—Wenderoth, Lind & Ponack

[57] ABSTRACT

An electrolytic cell for the electrolysis of a sodium chloride solution includes a cathode compartment having therein a cathode for producing hydrogen during electrolysis and an anode compartment having therein an anode for producing chlorine gas during electrolysis. A single conduit is at the bottom of the cell for charging sodium chloride solution into the compartments and for discharging therefrom solutions resulting from electrolysis. A porous partition substantially separates the compartments and has a lower end terminating above the bottom of the cell at the single conduit, such that the lower ends of the compartments are in free communication. A mixing chamber is connected to the upper ends of the two compartments to mix the hydrogen and chlorine gas and to dynamically balance the pressures in the two compartments, thereby preventing mixing of the products of electrolysis from the two compartments.

3 Claims, 2 Drawing Figures

APPARATUS AND PROCESS FOR PRODUCING CHLORINE GAS AND FOR EMPLOYING SUCH CHLORINE GAS FOR THE PRODUCTION OF CHLORINE WATER

BACKGROUND OF THE INVENTION

The present invention relates to an apparatus and process for producing chlorine gas. The present invention more particularly is directed to such a process and apparatus for producing chlorine gas and for employing such chlorine gas for the production of chlorine water.

The apparatus and process of the present invention particularly are capable of discontinuous, intermittent operation and of being fully automated in order to produce small or moderate quantities of chlorine water produced by quantities of chlorine gas of the order of a few grams or even kilograms per work cycle.

Even further, the present invention relates to such an apparatus and process capable of producing chlorine water for small consumers, such as washing machines, dishwashers, disinfecting devices, purifying plants, and the like.

It is known that chlorine water generally is prepared by absorption of chlorine in water. This resultant solution is known to be highly unstable over time, and in practice permits only immediate use without substantial storage or wide spread marketing or transportation.

On the other hand, the production of chlorine gas has been and still is carried out on an industrial scale in large capacity plants, either for direct use, for example for the production of chlorinated solvents, plastic materials, chemical intermediates, etc., or for distribution in tanks or in cylinders. However, for several types of consumers, for example in domestic, hospital, dairy, alimentary and sanitary fields, even this type of distribution, transportation and storage is not practical. As a matter of fact, these types of consumers benefit from time to time from the bleaching, disinfecting and deodorizing capabilities of chlorine. However, the supply of chlorine gas in cylinders for on-site preparation of chlorine water also creates difficulties that are insurmountable in practice. For example, it is necessary to employ skilled personnel to carry out the operation of absorbing chlorine gas into water, as well as due to toxicity problems associated with the handling of chlorine gas. This particularly is true when there is a tendency to eliminate the transportation of chlorine gas in cylinders or in tanks due to the high risks and safety problems connected therewith.

These difficulties become essentially impossible in the case of domestic consumers for whom useful quantities of chlorine gas are very modest and the use of which is variable over a period of time. Accordingly, in these domestic situations, it heretofore has been indispensable to resort to the use of aqueous solutions of sodium hypochlorite, i.e. solutions obtained by absorbing chlorine gas is a diluted aqueous solution of sodium hydroxide, and then diluting this solution to 5% active chlorine. However, in addition to the specific minor active ingredient, such sodium hypochlorite solution provides further problems of being caustic and of emitting irritating and harmful vapors, although these problems of toxicity are relatively minor compared to those associated with the direct use of chlorine gas.

With specific reference to domestic comsumers, proposals have been offered to use in washing machines and dishwashers electrolytic cells for the on-site production of chlorine gas which immediately is absorbed in water, thus forming chlorine water which, during an appropriate stage of the washing cycle, is fed directly to a wash tank. More particularly, there have been proposed electrolytic cells with two compartments, namely an anode compartment and a cathode compartment, the two compartments containing appropriate anode and cathode electrodes, physical separation between the two compartments being achieved by a porous partition or diaphragm which however enables the two compartments to be in electrolytic communication.

In electrolytic cells of this general known construction, during electrolysis of a solution with a sufficient concentration of sodium chloride, chlorine gas is developed at the anode and hydrogen is developed at the cathode, with the release of corresponding quantities of alkali solutions. If the anodic and cathodic products of electrolysis mix with one another, the chlorine and sodium hydroxide react to form a sodium hypochlorite solution, i.e. a hypochlorite cell, thereby cancelling the current yield for the production of chlorine gas. Accordingly, when the primary object of the electrolysis operation is to produce chlorine gas, the products of electrolysis must be prevented from mixing. However, such mixing can occur by two specific means, namely (a) mechanical mixing of the anodic and cathodic solutions, and (b) migration to the anode, under the action of the electric field, of $OH^-$ ions corresponding to the particular alkalinity at the cathode, and the combination of such ions with chlorine gas at the anode. As indicated above however mixing of either type must be prevented when the primary object of the electrolysis operation is the production of chlorine gas.

Another problem of significance with respect to electrolytic cells for the production of chlorine gas intended for the above discussed uses involves the formation of deposits at the electrodes and on the porous partition or diaphragm separating the anode and cathode compartments. As a matter of fact, in order to produce small or even modest quantities of chlorine, it is inconceivable to attempt to carry out preliminary treatments of acidification and purification of the brine, i.e. of the initial sodium chloride solution, to attempt to reduce the concentration of calcium and magnesium salts therein to the order of a few parts per million. Calcium and magnesium salts normally are contained in the sodium chloride and in the water with which the sodium chloride solution is prepared in quantities on the order of hundreds, or even thousands, of parts per million. Such salts precipitate at the cathode, in the cathodic solution, and on the diaphragm or partition as a result of alkalinization which accompanies the generation of hydrogen in the cathode compartment. The precipitation of calcium carbonate and magnesium hydroxide blocks the passage of the electric current and jeopardizes the proper operation of the electrolytic cell, even to the point of irreparably damaging it due to resultant irregular increases in temperature. Particularly, the precipitation of the above mentioned salts effects the porous partition which thus remains at least partially obstructed on the surface thereof facing the cathode compartment, the result being the disadvantages and problems mentioned above.

Attempts have been made to overcome these problems by resorting to an operating cycle whereby the polarities of the electrodes of the cell periodically are reversed, such that each compartment and electrode is operated alternately as an anode and as a cathode. During operation of one of the compartments as an anode compartment, the deposits at both the electrode thereof and on the adjacent surface of the diaphragm are removed and returned to the solution. However, this arrangement, no matter how advantageous it might appear, does not entirely solve the problem.

The possible problem of toxicity of chlorine produced generally can be solved by delivering the chlorine to an in-water absorption tower. However, another problem associated with this type of electrolytic cell results from the mixture of chlorine gas produced in the anode compartment with hydrogen gas generated in the cathode department. Such mixture may become explosive.

SUMMARY OF THE INVENTION

With the above discussion in mind, it is an object of the present invention to provide an apparatus and process for the production of chlorine gas, and an apparatus and process for employing such chlorine gas for the production of chlorine water, which are suitable for small and medium sized consumers and which solve the above discussed and other conventional disadvantages in a highly satisfactory manner.

It is a further object of the present invention to provide an apparatus and process for the production of chlorine gas, and thereby of chlorine water, particularly suitable for use with electric household appliances which operate intermittently and which are capable of being fully automated.

These objects are achieved in accordance with one aspect of the present invention by the provision of an electrolytic cell for the electrolysis of a sodium chloride solution, the cell including a cathode compartment having therein a cathode for producing hydrogen during electrolysis and an anode compartment having therein an anode for producing chlorine gas during electrolysis, the electrodes being fed with an electric voltage suitable for achieving the electrolysis operation and which may be under the control of a circuit capable of reversing, according to a predetermined program, the polarities of the two electrodes. A single conduit is positioned at the bottom of the cell for charging sodium chloride solution into the compartments and for discharging therefrom solutions resulting from the electrolysis operation. A porous partition or diaphragm substantially separates the two comparatments, with the partition or diaphragm having a lower end terminating above the bottom of the cell at the single charging and discharging conduit, with the result that the lower ends of the two compartments are in free communication with each other. The tops of the compartments have empty spaces for collecting the gases generated during electrolysis, and these spaces are in communication with each other, for example by being connected to a common collector for delivering gases to an in-water absorption tower for contacting the chlorine gas with water and thereby forming chlorine water. The pressure in the two compartments is dynamically balanced, for example by supplying the hydrogen and chlorine gas to a mixing chamber. This prevents mixing of the products of electrolysis from the two compartments.

In accordance with another aspect of the present invention, chlorine gas is produced by electrolyzing a solution of sodium chloride in an electrolytic cell including cathode and anode compartments, thereby producing hydrogen and chlorine gas, respectively. The electrolysis operation is carried out on a concentrated, preferably a saturated, aqueous solution of sodium chloride, for example containing approximately 300 g/l NaCl, until only a portion of the sodium chloride initially present in the solution is disassociated or separated therefrom. Preferably, the electrolysis operation is carried out until not more than two-thirds, and still more preferably not more than one-third, of the sodium chloride initially present in the solution is disassociated or separated from the solution. Such condition corresponds to a current yield for the generation of chlorine gas which does not drop below 50%. In other words, the electrolyzing is continued until the current yield for the generation of chlorine gas no longer is maintained at at least 50%. This same operating condition can be expressed as a limiting condition of the concentration of sodium hydroxide in the cathode compartment being no more than 50 g/l. In other words, the electrolyzing is continued until the resulting concentration of sodium hydroxide in the cathode compartment reaches a maximum of 50 g/l.

This condition however does not depend on the initial sodium chloride concentration, but rather on the operating perameters of the cell, i.e. current intensity, duration of electrolysis, and volume of cathode compartment.

In accordance with a further feature of the present invention, at least a portion of the gaseous mixture of $H_2 + Cl_2$ produced during the electrolysis operation and delivered to a common collector is subjected to conditions sufficient to and capable of causing such gases or constituents to react to form hydrochloric acid. Specifically, the hydrogen and chlorine gas may be subjected to controlled or measured ultraviolet radiation in a chamber between the electrolytic cell and the absorption tower. The resultant hydrochloric acid is supplied together with the remainder of the chlorine gas to the absorption tower to form therein chlorine water in an acidic solution, thereby maximizing the sterilizing or bleaching effects.

The present invention is not intended to be limited to use only by small consumers, but rather may be employed by consumers requiring considerable quantities of chlorine water, e.g. water purifying plants. In such case, batteries of electrolytic cells according to the present invention are employed, and are equipped with absorption towers. Thereby, it is possible to produce large quantities of chlorine water while still achieving the advantages of safety and ease of handling of the present invention associated with modest volumes of hydrogen and chlorine mixture.

BRIEF DESCRIPTION OF THE DRAWINGS

Other objects, features and advantages of the present invention will be apparent from the following detailed description, with reference to the accompanying drawings, wherein.

DETAILED DESCRIPTION OF THE INVENTION

Figure 1:
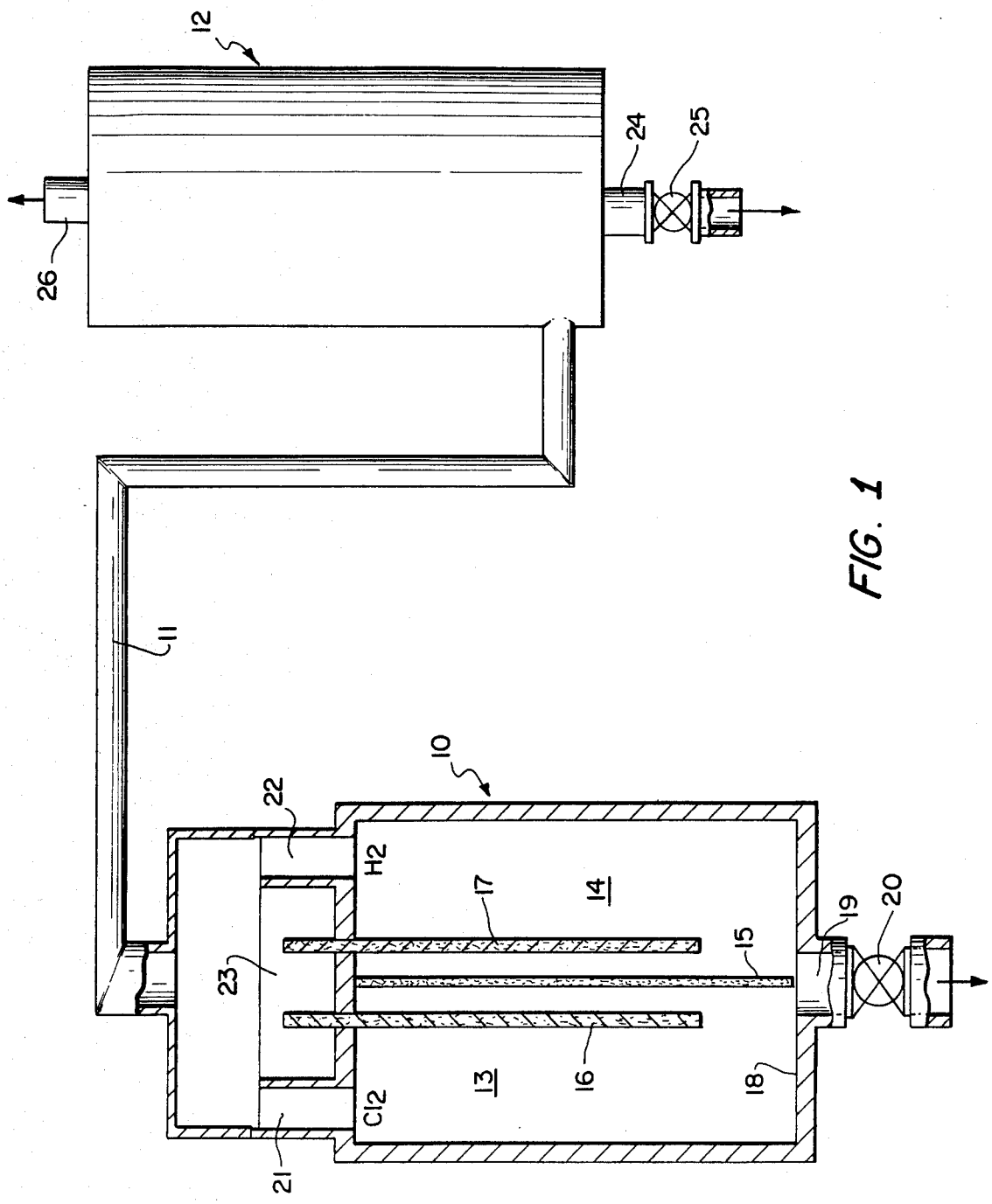
FIG. 1 is a schematic view of an electrolytic cell in accordance with the present invention in combination with an in-water absorption tower.

With reference to FIG. 1, there is shown therein an electrolytic cell 10 connected by means of a collector or conduit 11 to an in-water absorption tower 12 for receipt of chlorine gas produced in cell 10 and for producing therefrom, by contact with water, chlorine water. Cell 10 is divided into two compartments 13, 14 by a diaphragm or partition 15 which physically separates the two compartments but which allows ion communication therebetween to enable electrolysis to occur within the cell. The construction and material of diaphragm 15 are known in the art and allow ions to pass from one compartment to the other.

Within compartments 13, 14 are electrodes 16, 17, respectively, which are of known construction and preferably are made from impregnated graphite. The electrodes perform as an anode and a cathode, and in FIG. 1 it is assumed that electrode 16 is the anode and electrode 17 is the cathode. Accordingly, chlorine gas is generated in compartment 13, and hydrogen is generated in compartment 14.

At the bottom of the cell 10 is a single aperture or conduit 19, controlled by a valve 20, for achieving rapid, if not instantaneous, charging and discharging of brine to and from the compartments 13, 14. The lower end of diaphragm or partition 15 terminates slightly above the bottom 18 of cell 10 at the conduit 19.

Compartments 13, 14 freely communicate through connections 21, 22 with each other and with a mixing chamber 23 wherein the chlorine gas and hydrogen are mixed together and then are passed to collector or conduit 11 and to tower 12. Chamber 23 may be in close proximity to the upper end of the cell and may be equipped with a return conduit or conduits, thereby to function as a separator of foam transported by the gas and to return to the cell liquids thus separated.

Tower 12 is intended to be any known absorption tower or device capable of contacting the chlorine gas with water such that the water absorbs the chlorine gas to form chlorine water. Tower 12 has a drain 24 equipped with a valve 25 for the discharge of chlorine water. Tower 12 further has a breather pipe 26 through which unabsorbed hydrogen gas may be eliminated, it being understood that appropriate safety measures are provided for handling of such hydrogen gas. It is advantageous if tower 12 naturally operates as a unit for preparing and for storing chlorine water.

Depending on the user with which the cell 10 and tower 12 are associated, control valve 25 may be operated in synchronization with the work cycle of the user, for example in the case of a washing machine to feed chlorine water to a wash tank during an appropriate phase of a washing cycle.

The electrolytic cell of the invention may be equipped with appropriately controlled feed circuits of conventional type. It will be apparent from the above description that the operation of cell 10 and therefore the production of chlorine gas and chlorine water, as well as the dellivery of chlorine water to a user, can be fully automated as a function of a general cycle control, and that such operations can occur intermittently.

Figure 2:
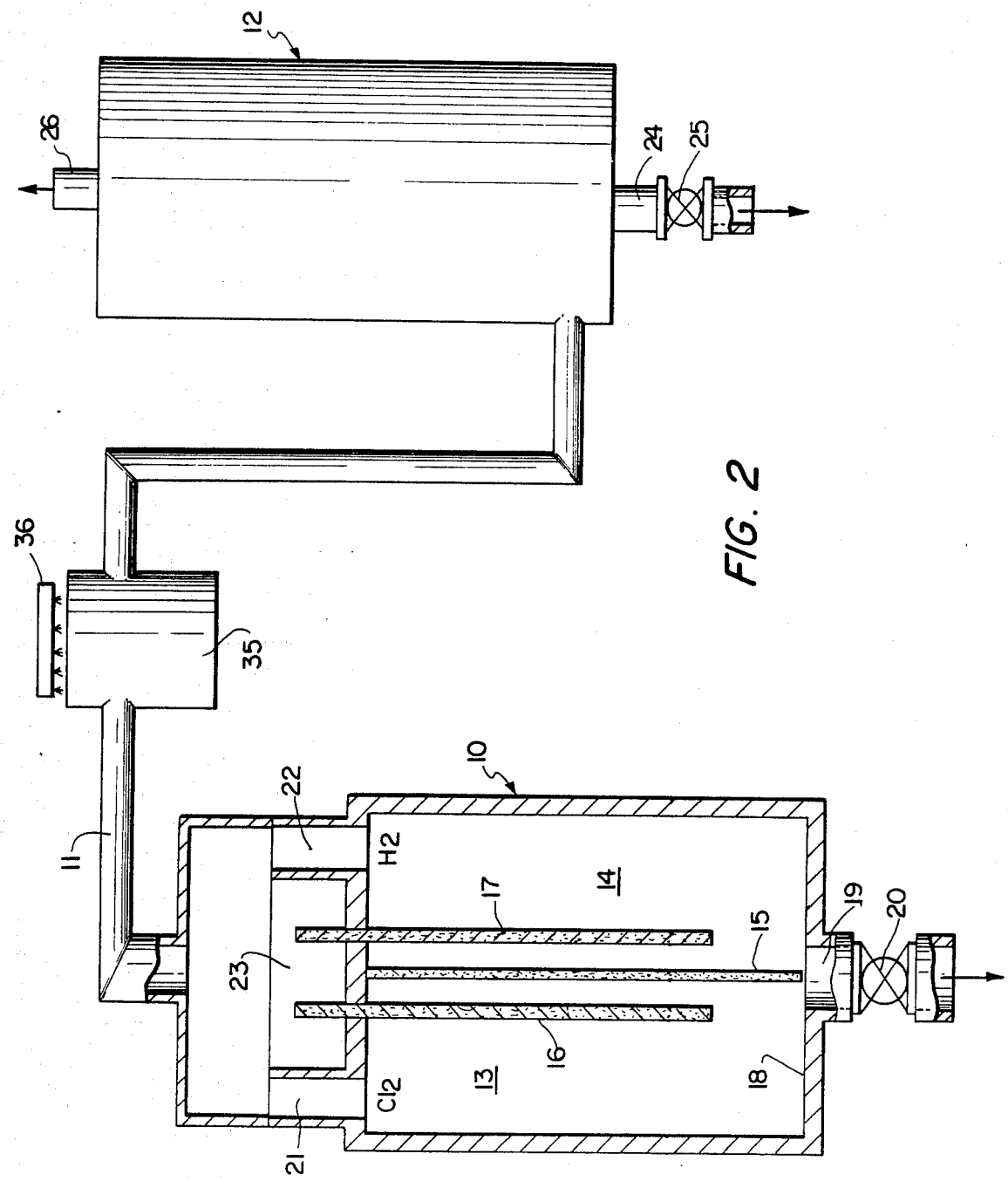
FIG. 2 is a schematic view similar to FIG. 1 but of a modification in accordance with the present invention.

With reference to FIG. 2, the embodiment thereof generally is the same as the embodiment of FIG. 1. However, the embodiment of FIG. 2 additionally includes structure for reacting at least a portion of the mixed hydrogen and chlorine gas to form hydrochloric acid which may be supplied to the tower 12. Specifically, a chamber 35 is accommodated in conduit 11. Within chamber 35 is achieved the, preferably partial and controllable, reaction of the chlorine gas with the hydrogen to form hydrochloric acid. This reaction may be brought about by ultraviolet radiation which may be controlled or measured as to intensity and/or duration by means of a suitable radiating lamp 36. In this manner, tower 12 will receive not only chlorine gas, but also hydrochloric acid. As a result, the solution formed in tower 12 will be an acidic solution having an activity which is greater than that of plane chlorine water, both as a bleaching agent and as a sterilizer. As a matter of fact, it generally is known that for sterilization and water purification operations the activity of chlorine water is a function of the acidity of the medium into which the chlorine water is introduced. Generally water into which the chlorine water is introduced is alkaline, to varying degrees. Therefore, the degree of acidity imported to the chlorine water can be employed to modify the alkalinity of the water to which the chlorine water is added, and thereby to bring about optimum sterilizing or bleaching conditions. As an example, the optimum pH may be 6, whereas the water of the distribution system might normally have a pH on the order of 8.

It is intended that the acidity of the chlorine solution obtained during the absorption phase may be controlled and made uniform by measuring the reaction, and that this operation may be automated within the limits within the operating cycle of the cell.

An important feature of the present invention is that the free or mixing chamber 23 creates a condition such that the electrolytic cell 10 operates in a manner that there is achieved a dynamic equilibrium or balancing of the pressures acting in the two electrode compartments 13, 14. In other words, chamber 23 causes a balancing of the pressures in the two cells, such that the two cells are under dynamic equilibrium. During the electrolysis operation the gas that is discharged at the face of each electrode directed toward the porous partition causes the solution in the respective compartment to be mixed again and the concentration thereof to remain constant. This occurs in both compartments. Due to the above discussed equilibrium of pressures, the anodic and cathodic solutions do not mix, and no filtering occurs through the porous partition 15. This feature remarkably distinguishes the cell of the present invention, both in concept and in structure, from known, conventional diaphragm cells for the production of sodium hydroxide and chlorine, i.e. with use of a filtering diaphragm with adjustable filtering. The migration to the anode, under the action of the electric field, of $OH^-$ ions being developed in the cathode compartment is regulated, through the mobility of the $OH^-$ ions, by the electrical gradient established in the solution present in the cathode compartment.

Accordingly, working with a sodium chloride solution which is heavily concentrated initially, unlike normal cells in which there is carried out the electrolysis of sea water with an average concentration of 35 g/l NaCl, and limiting the decomposition of the sodium chloride in such a way that the cathodic solution maintains for the duration of the electrolysis operation a high conductivity with modest potential gradients, the flow of $OH^-$ ions issuing from the cathode compartment and entering the anode compartment is thus also modest. Accordingly, the current yield for the development of chlorine gas remains high, typically about 85%, and not less than 50%. The electrolysis operation is not continued when the current yield for the generation of chlorine gas is below 50%. This means that the electrolysis operation is not continued when the resulting concentration of sodium hydroxide in the cathode compartment is more than 50 g/l.

Conceptually equivalent variations of the construction of the cell according to the invention are possible and are intended to be encompassed within the scope of the present invention. For example, the specific position of chamber 23 may be varied. Chamber 23 may be provided in the upper portion of the cells or immediately upstream of the absorption tower. Furthermore, the dimensions of chamber 23 and of the conduit or conduits connecting cell 10 and tower 12 may be reduced to avoid losses of chlorine and to control reaction of the mixture of hydrogen and chlorine gas to more easily prevent the possibility of explosion.

Although the present invention has been described and illustrated with respect to preferred features thereof, it is to be understood that other changes and modifications may be made to the specifically described and illustrated features without departing from the scope of the present invention.

I claim:

1. An apparatus for producing chlorine gas and for employing said chlorine gas for the production of chlorine water, said apparatus comprising:
    an electrolytic cell for the electrolysis of a sodium chloride solution, said cell comprising a cathode compartment having therein a cathode for producing hydrogen during electrolysis and an anode compartment having therein an anode for producing chlorine gas during electrolysis, single conduit means at the bottom of said cell for charging sodium chloride solution into said compartments and for discharging therefrom solutions resulting from electrolysis, and a porous partition substantially separating said compartments, said partition having a lower end terminating above the bottom of said cell at said charging and discharging means, such that lower ends of said compartments are in free communication;
    an absorption tower for contacting chlorine gas produced in said anode compartment with water, and thereby for forming chlorine water; and
    means for supplying the hydrogen and chlorine gas produced in said compartments to said absorption tower, and for dynamically balancing the pressure in said compartments and thereby preventing mixing of the products of electrolysis from said cathode and anode compartments, said supplying and balancing means comprising a chamber connected to upper ends of said compartments for receiving therefrom and mixing said hydrogen and chlorine gas, and a conduit for passing the thus mixed gases to said absorption tower.

2. An apparatus as claimed in claim 1, further comprising means for reacting at least a portion of said mixed hydrogen and chlorine gas to form hydrochloric acid prior to the supply thereof to said absorption tower.

3. An apparatus as claimed in claim 2, wherein said reacting means comprises a source of controlled ultraviolet radiation.

* * * * *